UNITED STATES PATENT OFFICE.

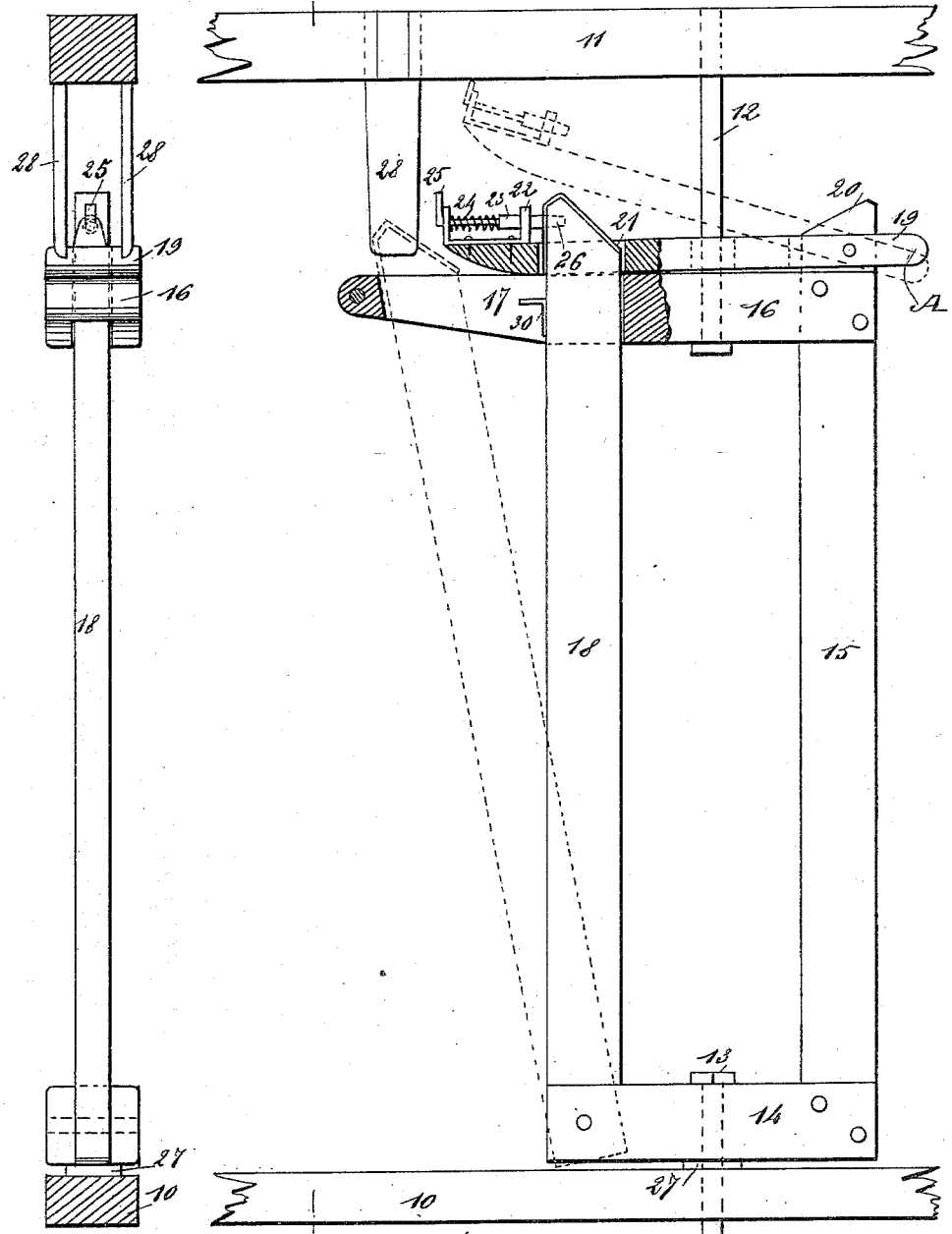

JOHN PRIEST, OF FRANCONIA, NEW HAMPSHIRE.

CATTLE-STANCHION.

SPECIFICATION forming part of Letters Patent No. 356,728, dated January 25, 1887.

Application filed September 16, 1886. Serial No. 213,675. (No model.)

*To all whom it may concern:*

Be it known that I, JOHN PRIEST, of Franconia, in the county of Grafton and the State of New Hampshire, have invented a new and Improved Cattle-Stanchion, of which the following is a full, clear, and exact description.

This invention consists in the construction of a novel form of cattle-stanchion, as will be described hereinafter, and specifically pointed out in the claims.

Reference is to be had to the accompanying drawings, forming a part of this specification, in which similar figures of reference indicate corresponding parts in both figures.

Figure 1 is a side view of a stanchion, a portion of the same being broken away and shown in section, in order that the construction may be clearly illustrated; and Fig. 2 is a sectional view taken on the line $x\ x$ of Fig. 1.

In the drawings, 10 represents the flooring of the stable, and 11 any stationary upper beam, the stanchion to be described being arranged between the floor and the said beam and held by bolts 12 and 13. The stanchion proper consists of a base-block, 14, to one end of which there is rigidly connected a vertical upright, 15, to which there is in turn rigidly connected a cross bar, 16, said cross-bar being formed with an elongated slot, 17. The block 14 is also provided with a swinging bar, 18, which is pivotally mounted within a recess formed at one end of the block, the upper end of this bar 18 riding in the groove or slot of the bar 16. Above the bar 16 there is arranged a clapper or catch-bar, 19, which is pivotally connected between its ends to a projection, 20, formed on the upright 15, the long arm of the clapper or catch-bar being formed with a slot, 21, through which the pivotally-mounted swinging bar 18 projects, and the short arm forming a projecting handle, A, by which the said catch-bar may be separated.

Upon one end of the catch-bar 19 I sometimes mount a bracket, 22, which carries a bolt, 23, which is normally pressed forward toward the swinging bar 18 by a spring, 24, the bolt being provided with a handle, 25; but I prefer the plate 30, to be presently described, as a means for preventing the raising of the bar by the cattle. This bolt 23 is arranged to enter a recess, 26, formed in the upper end of the bar 18, the arrangement being such that when the bolt is in engagement with the bar 18 the parts will be held in the position in which they are shown in full lines in Fig. 1; but if the bolt is freed from engagement with the bar 18 and the catch-bar 19 raised to the position in which it is shown in dotted lines in Fig. 1 the bar 18 may be swung to the position in which it is shown in dotted lines in the said figure.

In mounting the stanchion the bolts 12 and 13 are passed through apertures formed in the bar 16 and the block 14, a washer, 27, being interposed between the block 14 and the floor of the stable. The beam 11 carries two downwardly-extending plates or arms, 28, so arranged that when the bar 18 is swung back to the position shown in dotted lines the stanchion will be held in a line parallel with the beam 11—that is, it will be prevented from turning on its pivotal supports.

To the outer face of the bar 18 there is secured a plate, 30, the object of the said plate being to prevent the animal from passing its horn up through the slot and raising the catch-bar 19. This plate 30 is my preferred means for preventing the raising of the catch-bar, as it takes the place of a locking-bolt. The catch-bar may be raised when said plate is used by pressing on the handle end A by hand, or by means of a pole from the rear of the stall, whereas if the locking-bolt is used the stall must be entered to release said bolt or raise the catch-bar.

Having thus described my invention, I claim as new and desire to secure by Letters Patent—

1. A stanchion comprising an upright, a cross-bar secured to the upper end thereof and slotted at its free end, the swinging bar projecting up through the slotted end of the cross-bar, and a catch-bar pivoted between its ends above the slotted cross-bar, the long arm having a slot to receive the projecting end of the swinging bar, and the short arm forming a projecting handle, substantially as set forth.

2. The combination, with the rigidly-connected upright and slotted cross-bar and the catch-bar pivoted above said cross-bar and slotted at its inner end, of the upright swinging bar provided with a plate on its outer edge below the inner end of the catch-bar to prevent the same from being raised by the horn of a confined animal, substantially as set forth.

JOHN PRIEST.

Witnesses:
W. H. MITCHELL,
HARRY BINGHAM, 2d.